Figure 7:
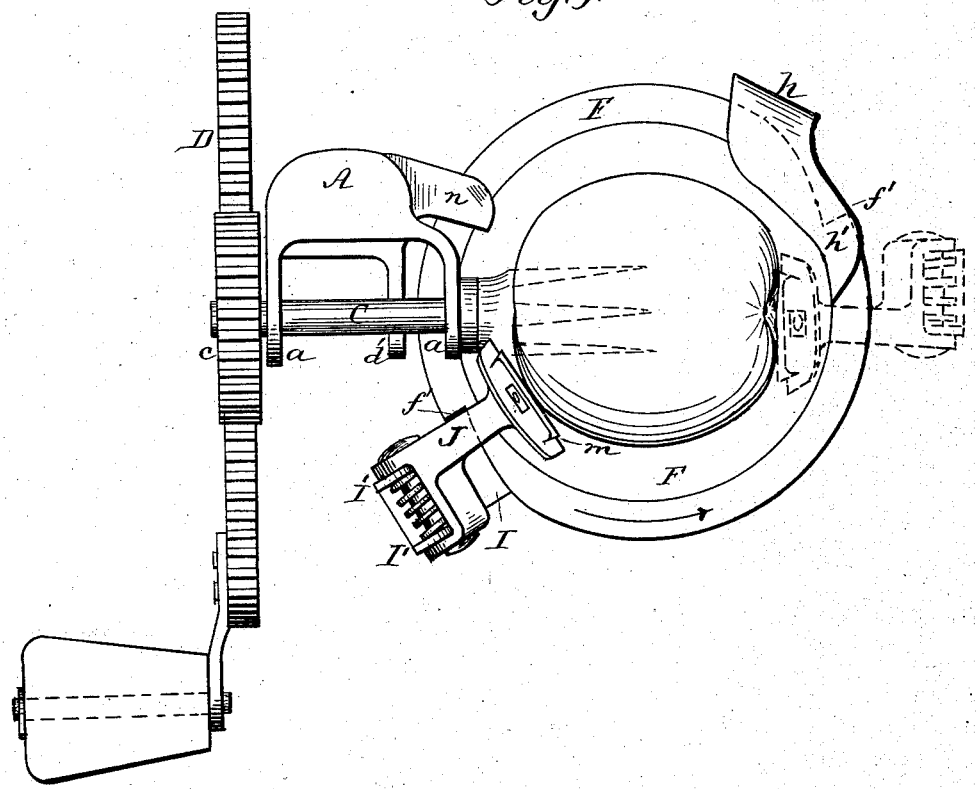

(Model.) 3 Sheets—Sheet 1.
J. BITTENBENDER.
APPLE PARER.
No. 325,903. Patented Sept. 8, 1885.
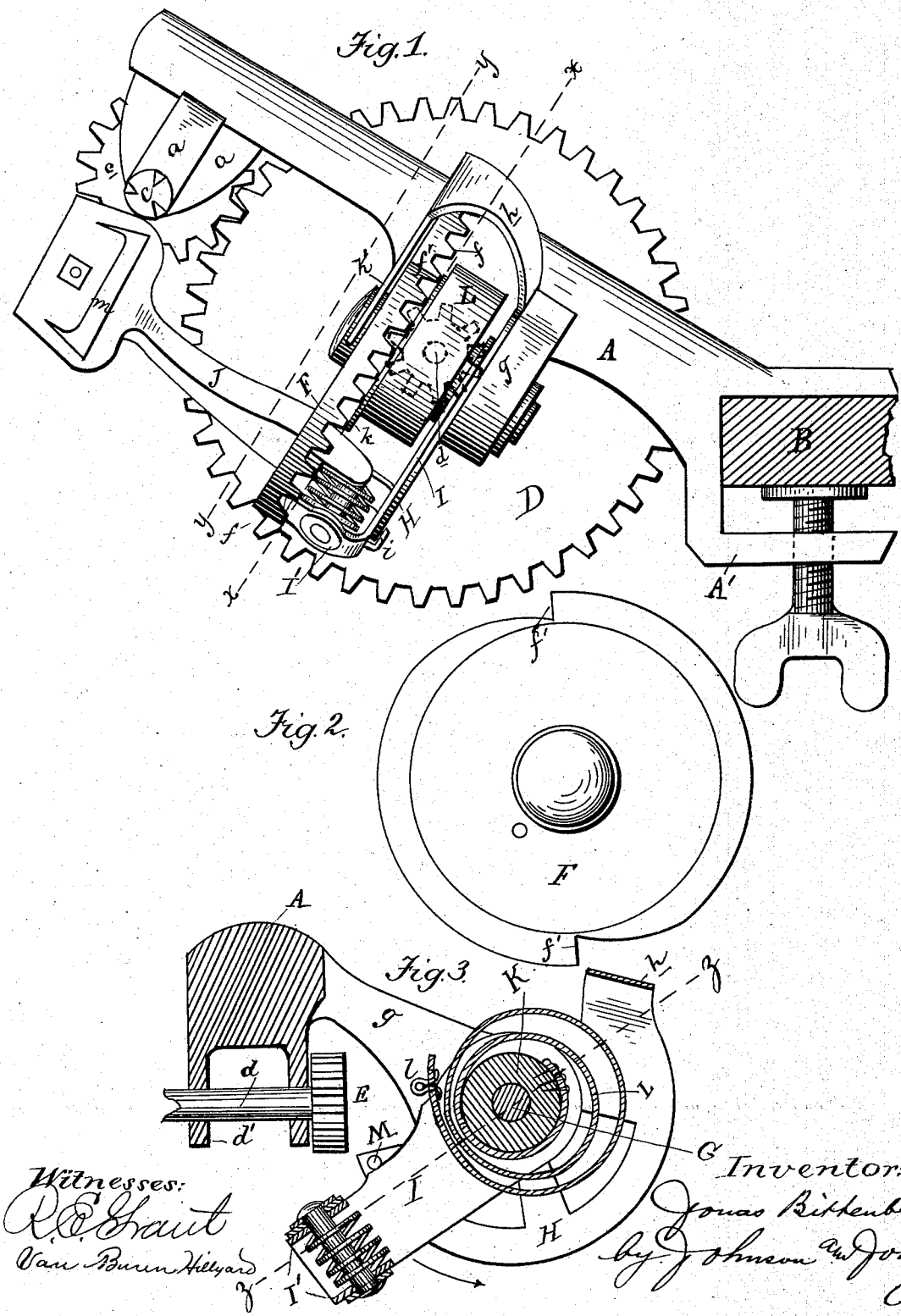

(Model.)
3 Sheets—Sheet 2.
J. BITTENBENDER.
APPLE PARER.
No. 325,903. Patented Sept. 8, 1885.
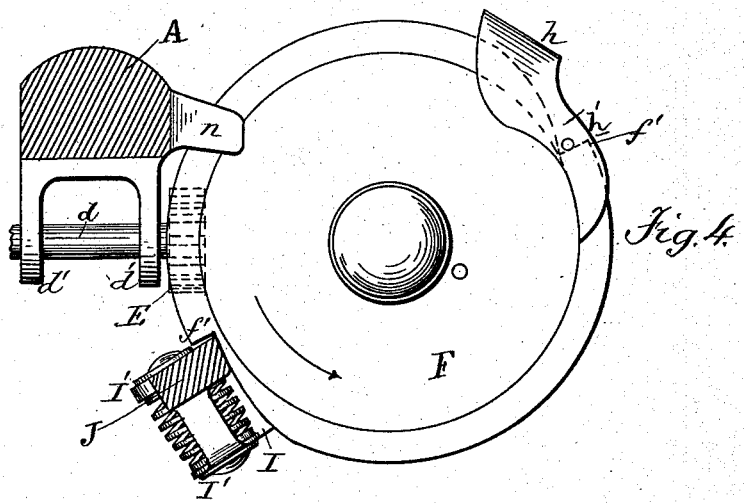
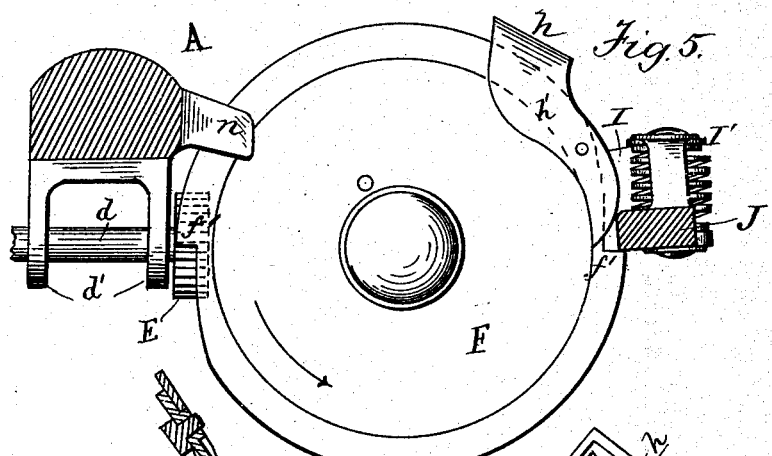
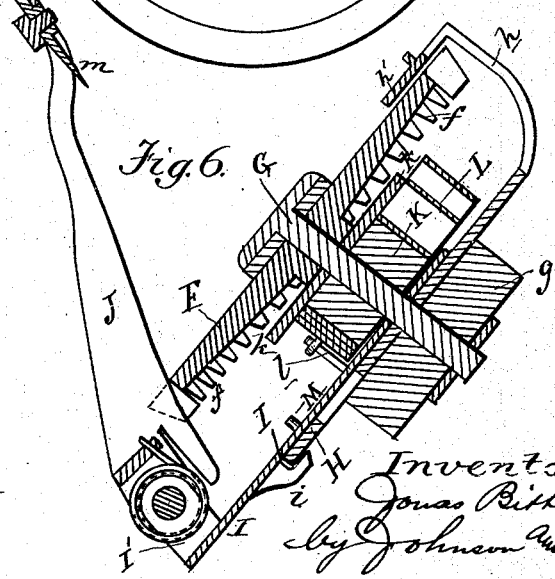
Witnesses:
R. E. Traut
Van Buren Hillyard
Inventor:
Jonas Bittenbender
by Johnson and Johnson
Attys (Model.) 3 Sheets—Sheet 3.
J. BITTENBENDER.
APPLE PARER.

No. 325,903. Patented Sept. 8, 1885.

Witnesses:
R. E. Grant
Van Buren Hillyard

Inventor:
Jonas Bittenbender
by Johnson and Johnson
Attys.

UNITED STATES PATENT OFFICE.

JONAS BITTENBENDER, OF MIFFLINVILLE, PENNSYLVANIA.

APPLE-PARER.

SPECIFICATION forming part of Letters Patent No. 325,903, dated September 3, 1885.

Application filed February 27, 1885. (Model.)

*To all whom it may concern:*

Be it known that I, JONAS BITTENBENDER, a citizen of the United States, residing at Mifflinville, in the county of Columbia and State of Pennsylvania, have invented new and useful Improvements in Apple-Parers, of which the following is a specification.

My invention is directed to improvements in apple-parers wherein the apple is carried by a revolving fork and the paring is effected by a knife carried by a spring-forced arm in contact with the apple. In my improved device the knife-carrying arm is independent of the operating-gear and is mounted upon an arm loosely pivoted to the stock, to which it is connected by a coil-spring against the tension of which the knife-arm moves in the paring operation, and which returns the knife-arm to its normal position after the paring. The usual knife-operating gear has provision for engaging with the knife-carrying arm at intervals and moving it in the paring operation against the tension of a spring, while provision is made for automatically releasing said knife-carrying arm from its engagement with its operating-gear at the end of its paring movement to allow it to be returned to its normal position by the tension of said spring, the object being to render the paring operation quick and effective and to deliver the parings free from lodgment in the device.

Referring to the accompanying drawings, Figure 1 represents a side elevation of the device in the position it occupies for work; Fig. 2, a top view of the gear-carrier for the knife-carrying arm; Fig. 3, a sectional detail on the line $x\ x$, Fig. 1, showing the spring-connection of the knife-carrying arm with the stock. Figs. 4 and 5 are sectional plan views on the line $y\ y$ of Fig. 1, the former showing the knife-carrying arm in engagement with the gear-carrier at the commencement of the paring movement, and the latter showing said knife-carrying arm at the end of its travel and in the act of being disengaged from said gear-carrier. Fig. 6 is a vertical central section on the line $z\ z$ of Fig. 3, and Fig. 7 is a top view showing the knife-arm at the stopping and starting point.

The stock or frame A is provided with a clamp, A', for securing it to a table or support, B, in an inclined overhanging position. Arms $a$, cast integral with the stock at its upper end, support the fork-shaft C, which is revolved by a pinion, $c$, on its outer end, meshing with a master gear-wheel, D, secured to the outer end of a shaft, $d$, mounted in suitable bearings, $d'$, integral with the stock.

The inner end of the master gear-shaft $d$ carries a pinion, E, which meshes with a circumferential gear, $f$, on the under side of the carrier F, as shown in dotted lines in Fig. 1, which carrier is loosely mounted on a stud, G, carried by an arm, $g$, of the stock.

A segmental guide-plate, H, is firmly secured to the stock-arm $g$, and is provided with an arm, $h$, branching therefrom, extending outwardly and upwardly and terminates in a cam, $h'$, located immediately over the carrier F. The outer edge of the cam extends slightly beyond the outer edge of the gear-carrier, as shown in Figs. 4 and 5, for the purpose of disengaging the knife-carrying arm from the gear-carrier at the end of the paring movement of the knife.

An arm, I, is loosely sleeved on the stock-stud G, and carries the knife-arm J on its outer end in suitable bearings, I', formed therewith. A hook, $i$, on the lower side of the pivoted arm I embraces the outer edge of the fixed guide-plate H and serves to steady and prevent any vertical displacement of said arm.

A hub, K, is permanently connected with the arm I, and is loosely mounted on the stud G, between the washer $k$ and the knife-carrying arm I, and is encircled by a coil-spring, L, having its inner end fastened to said hub and its outer end secured to a pin, $l$, on the arm of the stock. The gear-carrier F has notches formed in its circumference on diametrically-opposite sides to form abutting shoulders $f'$, by which it engages with and operates the knife-carrying arm forward at intervals.

In practice, an apple or analogous article having been impaled on the fork-shaft, and motion being imparted to the wheel D, the fruit will be revolved against the knife of the arm J, which latter bears against the apple, and at the same time, by reason of the connections above described, motion will be communicated to the gear-carrier F, and one of its shoulders, $f'$ coming in contact with the knife-carrying arm J, will move the same forward against the tension of the spring L till it reaches the cam h', at which point the fruit will have been pared and the knife-arm riding the cam will be forced outward and disengaged from the shoulder f' of the gear-carrier and returned to its normal position by the resiliency of the spring.

To prevent the knife-arm striking the fork-shaft in its retrograde movement, a stop, M, is affixed to the stock-guide plate.

It will be observed that the knife-carrying arm I makes only a partial revolution during the operation of paring, this being due to the width of the blade m, and in so mounting the same that its inner edge, or that portion nearest the fork-shaft, will be the first to operate, and the other portion of the edge will be brought into action as the arm is carried forward till at the end of its travel the outer or extreme edge of the blade will act last on the fruit.

By this arrangement the article is pared with great rapidity in the least possible movement of the cutter-arm.

The device is secured in such a position that it inclines upward and away from its support, allowing the parings to drop free of its parts.

A lug, n, extends from the stock and on the upper side of the gear-carrier, as in Fig. 5, and serves to keep the gear f of the same in engagement with its driving-pinion.

The essential feature of my invention is the mounting of the knife-arm so as to be acted on at intervals by an independent revolving carrier by which it is carried forward to its work against a yielding force, and automatically disengaging the knife-arm from the gear-carrier, when said force will act to return the arm to its normal position free of the gear-carrier.

I claim—

1. The combination, in an apple-parer, of a pivoted knife-carrying arm with a revolving driving-disk to engage said arm and a spring connected with the arm-support and with the main frame for returning said knife-arm when released from said driving-disk, substantially as described, for the purpose specified.

2. In an apple-parer, the combination of a pivoted knife-carrying arm with a revolving driving-disk for said arm and a spring having one end secured to a hub of the arm-support and the other end to the main frame, whereby the knife-arm is carried forward against a yielding force which operates to return it, substantially as described, for the purpose specified.

3. In an apple-parer, the combination of the pivoted knife-carrying arm and the revolving driving-disk therefor having diametrically-arranged shoulders f f, engaging the knife-arm at every half-revolution of said disk, and a retracting-spring connected to the knife-arm support and to the frame and wound and released at every half-revolution of said disk, with a fixed cam arranged to intercept the path of said arm and place it under the returning force of said spring, substantially as described, for the purpose specified.

4. In an apple-parer, the knife-arm, the revolving driving-disk therefor having diametrically-arranged shoulders f f, a fixed cam, h', a retracting-spring, L, connected with the stock, and an arm, I, to which the knife-arm is pivoted, operating to wind said spring during the advance movement of said knife-arm, all combined and mounted upon an arm of the stock, substantially as described, for the purpose specified.

5. In an apple-parer, the combination of the knife-arm, its pivoted support, and a coil-spring connected by one end to said pivoted support and by its other end to the stock-arm, with a gear-carrier and a fixed releasing-cam, the parts being constructed, arranged, and operating substantially as described.

6. The combination of the knife-arm, its pivoted support, and a coil-spring connecting the pivoted support to the stock-arm, with a gear-carrier diametrically notched or shouldered and a cam located within the path of said notches and extending beyond the periphery of the gear-carrier, as and for the purpose set forth.

7. The combination of a knife-arm, a gear-carrier to engage the same and carry it forward to its work, with a releasing device, a spring to return said knife-arm, and a stop to limit the retrograde movement of said knife-arm under the action of said spring.

8. The combination, in an apple-parer, of a pivoted knife-carrying arm, a pivoted support, I, therefor, having a hook, i, a fixed segmental plate, H, embraced by said hook and having a stop, M, with the driving-disk F, a spring, L, wound upon a hub of said knife-arm support as the latter is carried forward to its work, and means, substantially such as described, for releasing the knife-arm from its driver.

9. In combination with the knife-arm, its gear-carrier and spring L, and, as a means for steadying said knife-arm and releasing it from its gear-carrier, the segmental guide-plate H, provided with the fixed stop M, and an outwardly and upwardly extending arm, h, terminating in a cam-extension, h', substantially as shown and described.

In testimony whereof I have hereunto set my hand in the presence of two subscribing witnesses.

JONAS BITTENBENDER.

Witnesses:
A. E. H. JOHNSON,
J. W. HAMILTON JOHNSON.